UNITED STATES PATENT OFFICE.

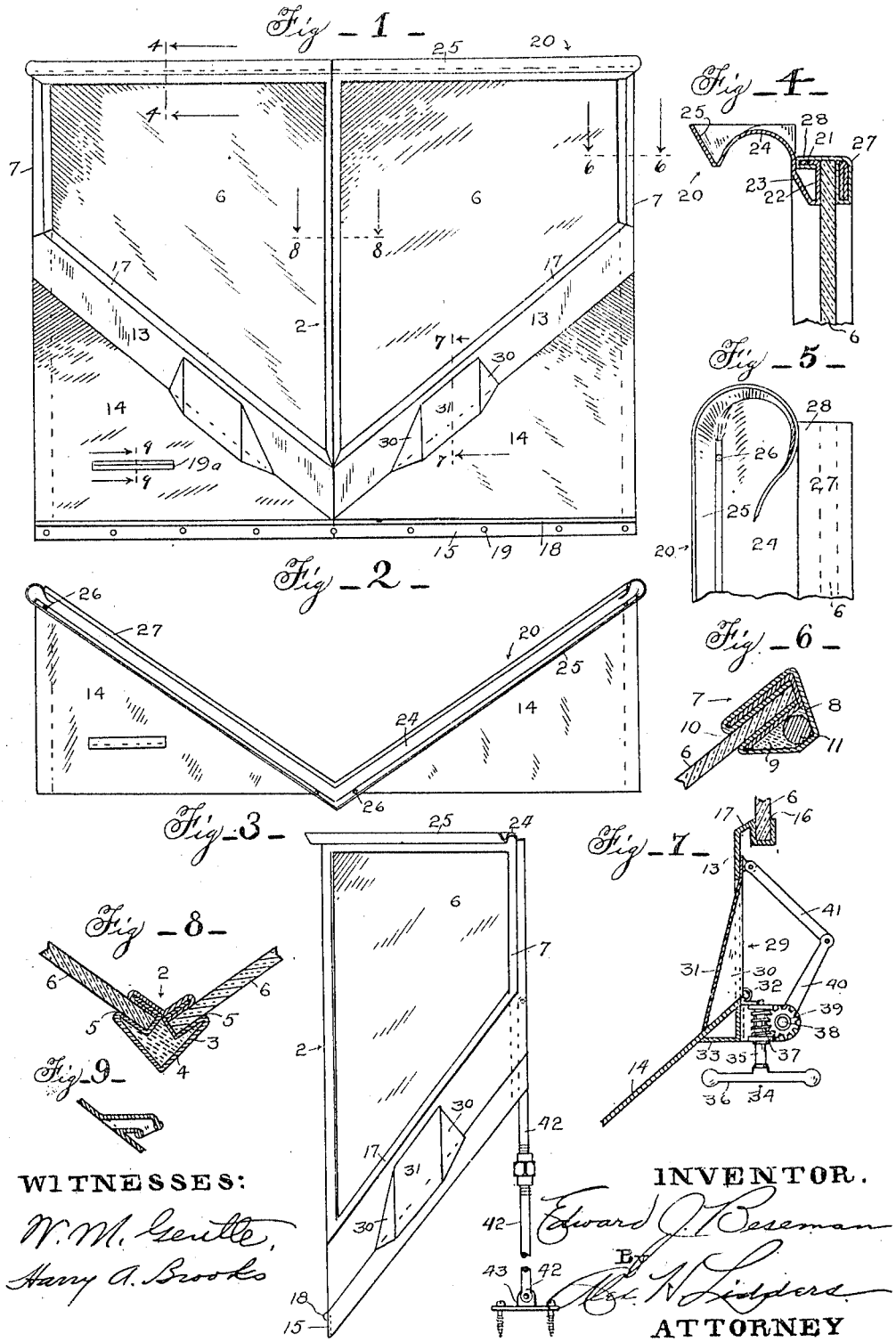

EDWARD J. BESEMAN, OF LOS ANGELES, CALIFORNIA.

WIND-SHIELD.

1,064,043. Specification of Letters Patent. Patented June 10, 1913.

Application filed April 25, 1912. Serial No. 693,216.

*To all whom it may concern:*

Be it known that I, EDWARD J. BESEMAN, a citizen of the United States of America, residing at Los Angeles, in the county of Los Angeles, State of California, have invented a certain new and useful Wind-Shield; and I do hereby declare the following to be a full, clear, and exact description of the invention, such as will enable others skilled in the art to which it appertains to make and use the same.

This invention relates to improvements in wind shields for vehicles.

One object of the invention is to provide novel and improved means for intercepting dust and conducting it to the sides of the wind shield.

Another object of the invention is to provide novel and improved ventilating means on the wind shield.

Further objects of the invention are to provide a novel and improved wind shield which is simple in character, economical to manufacture, light in weight, strong and durable, easily applied and adjusted, effective in action, of a neat appearance, and which is adapted to leave ample space for free access to parts that may be affixed on the dashboard.

With the above and other objects and advantages in view which will be apparent to those skilled in the art, the invention may be said to consist in the provision of the novel and improved features and in the novel and improved construction, arrangement and combination of parts and devices as will be apparent from the following description of the preferred form of construction embodying the invention, taken in connection with the accompanying drawings in which—

Figure 1 is a front elevation of a wind shield having the invention applied therein; Fig. 2 is a top plan view of the wind shield; Fig. 3 is a side elevation of the wind shield; Fig. 4 is a partial sectional view taken on the line 4—4 of Fig. 1; Fig. 5 is an enlarged plan view of one of the end portions of the top of the wind shield; Fig. 6 is a partial sectional view taken on the line 6—6 of Fig. 1; Fig. 7 is a partial sectional view taken on the line 7—7 of Fig. 1, the means for operating the ventilator being shown whole; Fig. 8 is a partial sectional view taken on the line 8—8 of Fig. 1, and Fig. 9 is a partial sectional view taken on the line 9—9 of Fig. 1.

The central vertical post 2 may consist of a single piece of sheet metal formed to provide longitudinally therein the chamber 3 adapted to be filled with cement 4, and the channels 5 for the reception of the inner end portions of the preferably glass panels 6 which extend outwardly and rearwardly at each side of the post 2. The side posts 7 may each consist of a single piece of sheet metal formed to provide longitudinally therein the chamber 8 adapted to be filled with cement 9, and the channel 10 for the reception of the outer end portion of the panels 6. A reinforcing rod 11 may be embedded in the cement 9.

The lower side portions of the shield may consist of single pieces of sheet metal formed to provide plane vertical surfaces 13 of substantially uniform height from the inner to the outer ends thereof and extending rearwardly and upwardly from the post 2 to the posts 7, and plane surfaces 14 extending forwardly and downwardly from the vertical surfaces 13 to the lower end portion 15 of the windshield. The vertical surfaces 13 may have the inner end thereof soldered to the post 2, and the outer end thereof soldered to the posts 7, and they may have the upper end portion thereof formed to provide channels 16 to receive the angular lower end portion of the panels 6, and narrow inclined surfaces 17 extending from the channels 16 to the upper end of the vertical surfaces 13. The lower end portion 15 of the windshield may be provided with a round or bead 18, and with openings 19 for screws or the like for attaching the wind shield to a dash board, not shown. The portion 15 is made sufficiently pliable so that the windshield may be tilted without the use of hinges. One of the plane surfaces 14 may be formed to provide a passageway 19ª for the reins, not shown, when the vehicle to which the wind shield is attached is horse drawn.

At the upper end of the wind shield are arranged suitable forwardly projecting devices 20 which are adapted to intercept dust and conduct it to the sides of the wind shield and thereby prevent it from passing over the wind shield. The devices 20 may be connected to the post 2 and to the posts 7 and may consist of sheet metal formed with the horizontal flange 21, the vertical surface 22, the narrow upwardly and forwardly inclined surface 23, the curved surface 24 to provide a channel on the underside of the devices 20, and the upwardly and forwardly inclined surface 25 which adjacent to the posts 7 is preferably curved and turned back onto the top of the curved surface 24. Openings 26 may be provided in the devices 20 to permit rain water to pass therethrough from the upper side of the devices 20. A channel for the upper end portion of the panels 6 is provided by means of the vertical surface 22 and the part 27 which latter may be provided with a recessed portion 28 whereby the part 27 may be connected with the flange 21 by placing the inner end of the recessed portion 28 over the outer end of the flange 21 and then sliding the part 27 into place.

Ventilators may be provided and constructed as follows: Openings 29 are provided in the vertical surfaces 13 and sheet metal plates formed with converging substantially triangular side portions 30 and with an inclined portion 31 therebetween are adapted to have the upper end of the plate in contact with the vertical surfaces 13 and the lower end of the plate in contact with the plane surfaces 14 to close the openings 29; suitable pivot mountings 32 at the ends of the side portions 30 being carried on a rib 33 affixed on the underside of the upper end portion of the plane surfaces 14. Convenient and effective devices 34 for operating the plates in the openings 29 to nicely adjust the ventilation may consist of the shafts 35 rotatively mounted near the lower end of the openings 29 and having hand-wheels 36 and worms 37 thereon. shafts 38 having wheels 39 thereon in mesh with the worms 37, arms 40 fast on the shafts 38, and links 41 pivotally connected between the arms 40 and the upper end portion of the plates. It will be seen that when the plates are operated they will be held in adjusted position and the air passing through the openings 29 will strike only the upper part of the bodies of the occupants of the vehicle and if desired the ventilation may be adjusted to have the air strike only the faces of the occupants.

Suitable extension rods 42 may be pivotally connected with the wind shield and with a bracket 43 adapted to be secured by screws 44 to any stationary part on the vehicle to hold the wind shield in adjusted position.

From the foregoing it will be apparent that in use the wind shield acts effectively to cut the air and deflect it and the dust carried thereby sidewise past the outer ends of the wind shield. Also it will be seen that the form and arrangement of the panels 6 is such as to afford a free and unobstructed view therethrough.

Though only one form of construction embodying the invention has been particularly illustrated and described there are many changes and modifications thereof that will readily occur to those skilled in the art; wherefore the right is reserved to all such changes and modifications as do not depart from the spirit and scope of the invention as defined in the appended claims.

I claim:

1. A wind shield comprising a vertical central post and side posts having channels thereon, lower side portions consisting of sheet metal formed to provide plane vertical surfaces having channels thereon and of substantially uniform height from the inner end to the outer end thereof and extending rearwardly and upwardly from the central post to the side posts and plane surfaces extending forwardly and downwardly from the vertical surfaces to the lower end portion of the windshield, transparent panels provided with an angular lower end portion and arranged in said channels and forwardly projecting devices arranged at the top of said panels, said devices provided with channels on the underside thereof and adapted to intercept and conduct dust to the outer edge of the sides of the wind shield.

2. The combination of a wind shield having a central post and side portions connected with the post and extending outwardly and rearwardly from the post, forwardly projecting devices arranged at the top of said side portions, said devices provided with channels on the underside thereof and adapted to intercept and conduct dust to the outer edge of the sides of the wind shield.

3. A wind shield comprising a vertical central post and side posts of sheet metal formed to provide longitudinally therein a chamber for the purpose set forth, channels on the central and side posts, lower side portions consisting of sheet metal formed to provide plane vertical surfaces having channels thereon and of substantially uniform height from the inner end to the outer end thereof and extending rearwardly and upwardly from the central post to the side posts and plane surfaces extending forwardly and downwardly from the vertical surfaces to the lower end of the wind shield, forwardly projecting devices arranged at the top of the wind shield and provided with a channel on the underside thereof for the purpose set forth, channels carried by said devices, and transparent panels provided with an angular lower end portion and arranged in said channels, substantially as described.

4. A wind shield comprising a vertical central post and side posts, lower side portions consisting of sheet metal formed to provide vertical surfaces of substantially uniform height from the inner end to the outer end thereof and extending rearwardly and upwardly from the central post to the side posts and plane surfaces extending forwardly and downwardly from the vertical surfaces, transparent panels provided with an angular lower end portion and carried by said vertical surfaces and the central and side posts, openings in said vertical surfaces, plates at said openings formed with converging substantially triangular side portions and an inclined portion therebetween and adapted to have the upper end of the plates in contact with said vertical surfaces and the lower end of the plate in contact with said plane surfaces to close said openings, pivot mountings at the ends of said side portions, shafts rotatably mounted near the lower end of said openings and having handwheels and worms thereon, shafts having wheels thereon in mesh with said worms, arms fast on the last mentioned shafts, and links pivotally connected between said arms and the upper end portion of said plates, substantially as described.

In testimony whereof, I have signed my name to this specification in the presence of two subscribing witnesses at Los Angeles, county of Los Angeles, State of California, this 20th day of April A. D. 1912.

EDWARD J. BESEMAN.

Witnesses:
 ANNA B. DESSAU,
 A. H. LIDDERS.